United States Patent [19]

Dickhart, III et al.

[11] 4,273,498

[45] Jun. 16, 1981

[54] RAILWAY CAR TRAP DOOR LIFT

[75] Inventors: William W. Dickhart, III, Fort Washington; Richard H. Marvin, Philadelphia, both of Pa.

[73] Assignee: The Budd Company, Troy, Mich.

[21] Appl. No.: 92,439

[22] Filed: Nov. 7, 1979

[51] Int. Cl.³ .......................... B60P 1/44; B60P 3/06; B61D 1/44; B61D 3/06

[52] U.S. Cl. .................................... 414/556; 105/426; 105/432; 105/433; 105/436; 105/450; 280/166; 296/65 R; 410/7; 414/546; 414/920; 410/51

[58] Field of Search ............... 105/425, 426, 427, 430, 105/431, 432, 433, 436, 437, 438, 441, 443, 450; 280/163, 166; 296/65 R, 178, 179; 410/7, 9, 19, 51; 414/546, 556, 921

[56] References Cited

U.S. PATENT DOCUMENTS

| | | | |
|---|---|---|---|
| 986,103 | 3/1911 | Taylor | 105/437 |
| 1,040,299 | 10/1912 | McCune | 105/436 X |
| 1,387,134 | 8/1921 | Dufek | 105/436 |
| 2,162,964 | 6/1939 | Nichols | 105/430 |
| 3,709,155 | 1/1973 | Pringle | 410/7 |
| 3,893,697 | 7/1975 | Blitz et al. | 414/921 X |
| 3,913,759 | 10/1975 | Deacon | 414/546 |
| 3,986,724 | 10/1976 | Rivinius | 280/166 |
| 4,039,091 | 8/1977 | Adamski et al. | 414/556 |
| 4,081,091 | 3/1978 | Thorley | 105/430 X |
| 4,167,286 | 9/1979 | Geyer | 105/430 X |

*Primary Examiner*—John P. Silverstrim
*Assistant Examiner*—Howard Beltran
*Attorney, Agent, or Firm*—A. L. Trueax, Jr.

[57] ABSTRACT

A railway car includes conventional steps leading from a lower station platform to the floor level in a vestibule. A lift platform adapted to receive a seat or wheel chair is provided to lift a handicapped person who has difficulty going up or down steps. A motor is provided for moving the lift platform over the steps between the lower level and floor level while maintaining it in a horizontal position.

9 Claims, 4 Drawing Figures

FIG. 3
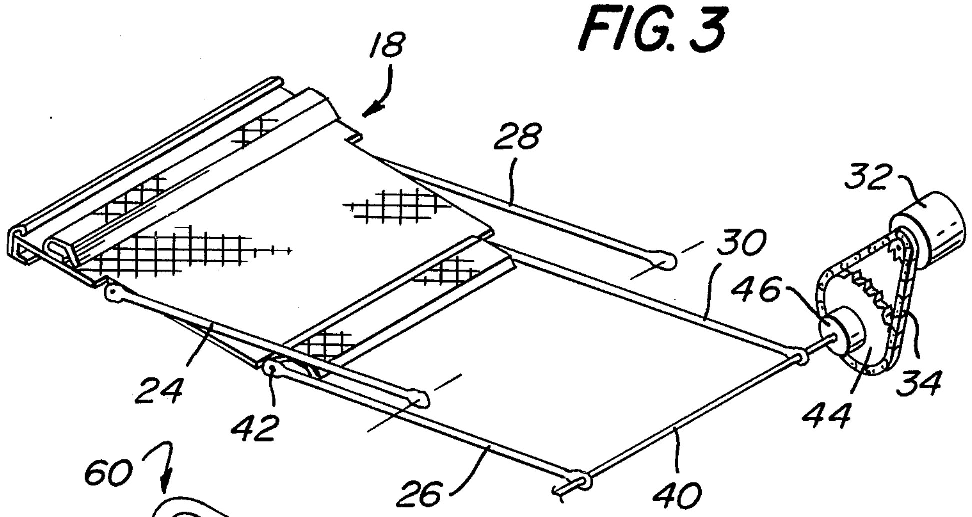
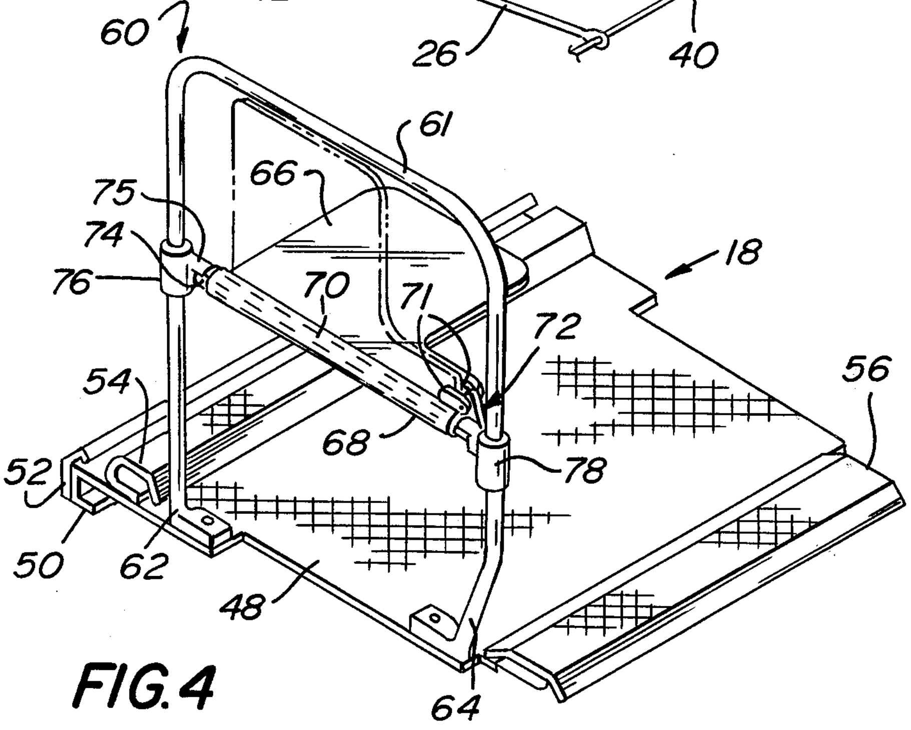
FIG. 4

RAILWAY CAR TRAP DOOR LIFT

BACKGROUND OF INVENTION

Normally a trap door is located in the vestibule of the rail car over steps. The trap door is hinged so that it can be moved between an upright vertical position and a downward horizontal position. This allows the conductor to permit a passenger to walk between the floor level of the car and a high station platform when the trap door is lowered. On the other hand, when a passenger goes between a low station platform and the floor level of the car, the trap door is raised to make accessible the steps below the trap door.

Elderly and handicapped persons, especially those confined to wheel chairs, have difficulty in boarding and leaving railway cars. This is particularly true when it is necessary to go up or down steps as when going from a lower station platform to the floor level of a vestibule of the car, or vice versa.

OBJECTS OF INVENTION

It is an object of this invention to provide improved means to enable an elderly or handicapped person to be lifted from a low station platform or the ground to the floor level of a railway car.

It is a further object of this invention to provide improved means for lifting a handicapped person into a railway car with the means serving a dual purpose of providing a lifting platform and a trap door over the steps of the car.

It is still a further object of this invention to provide an improved platform lift for receiving a seat or wheel chair to permit an elderly or handicapped person to be carried over steps of a rail car between upper and lower levels.

BRIEF SUMMARY OF THE INVENTION

In accordance with the present invention, a railway car includes steps leading from a lower station platform to a higher floor level in the vestibule of the car. A lift platform is adapted to receive a seat or wheel chair for an elderly or handicapped person. Means are provided to move the lift platform with the seat or wheel chair over the steps of the car between upper and lower levels. When the lift platform is not in use for lifting, it serves as part of the floor in the vestibule over the steps.

Other objects and advantages of the present invention will be apparent and suggest themselves to those skilled in the art, from a reading of the following specification and claims, taken in conjunction with the accompanying drawings.

DESCRIPTION OF THE DRAWINGS

FIG. 3 is an isometric view illustrating the lift platform of FIGS. 1 and 2, and FIG. 4 is an isometric view of a lift platform illustrating another embodiment of the present invention.

DESCRIPTION OF INVENTION

Figure 1:
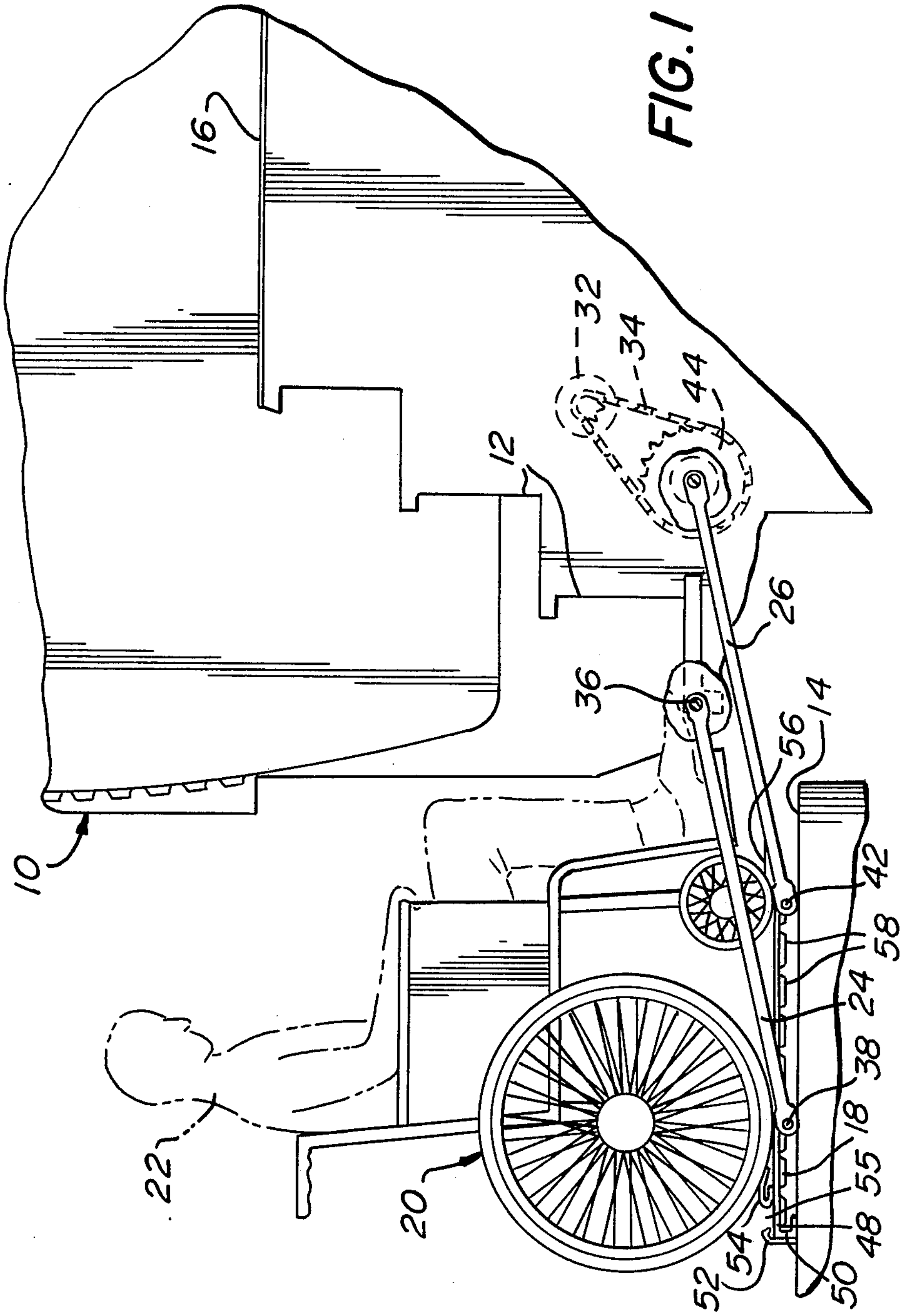
FIG. 1 is a side view of a lift platform having a wheel chair thereon with the lift platform being disposed at a lower level, in accordance with the present invention.
Figure 2:
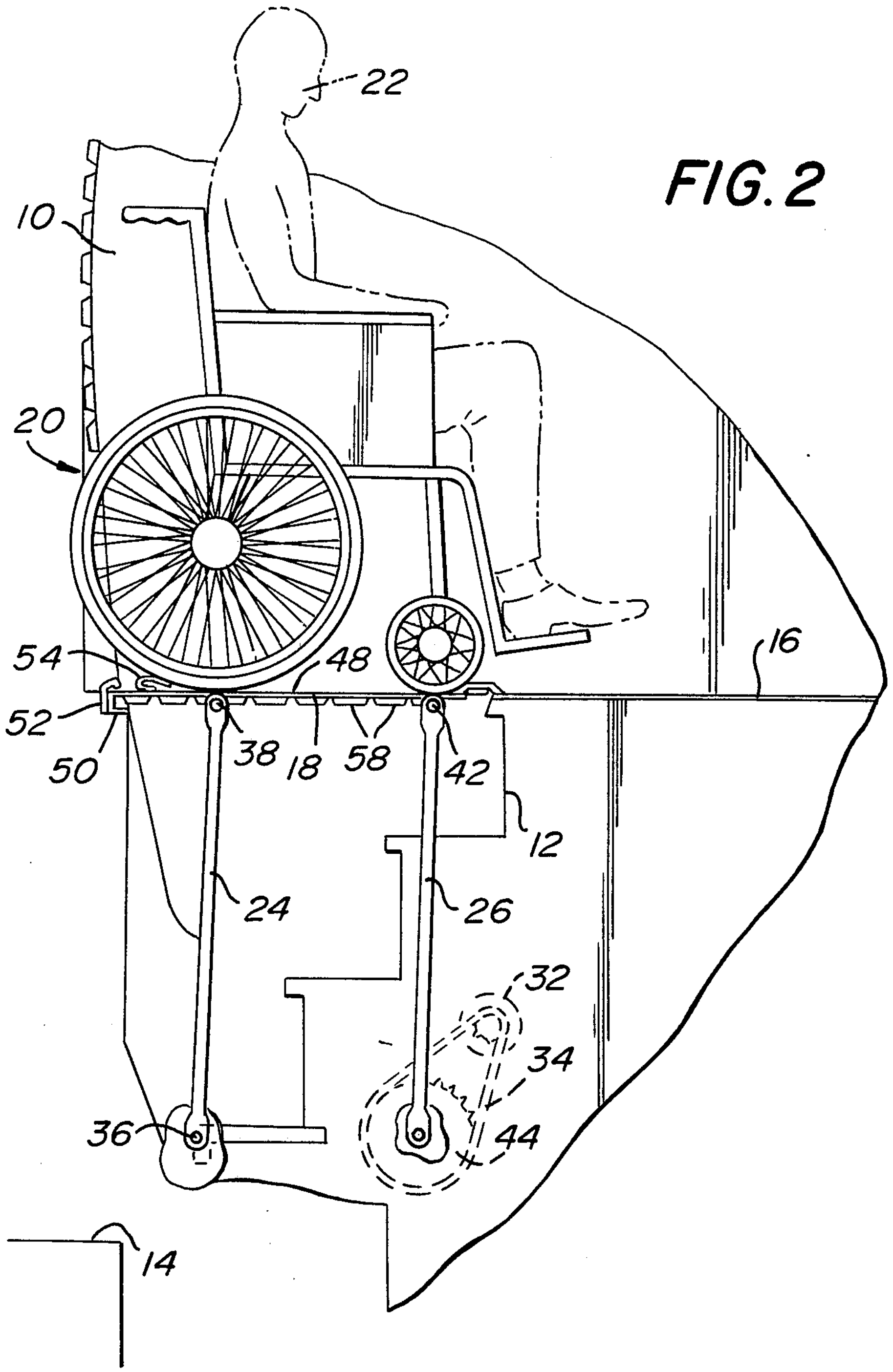
FIG. 2 is a side view somewhat similar to FIG. 1 wherein the lift platform is disposed over steps of a rail car at a higher or floor level position, in accordance with the present invention.

Referring to FIGS. 1, 2 and 3, a railway car 10 includes steps 12 leading from a lower station platform 14 outside the car to a higher level or floor 16 which may be part of a vestibule inside of the car. The steps 12 are disposed at the end of the car and lead onto the floor 16, which normally serves as a vestibule within the car. A door is generally disposed to open or close to permit passengers to pass between the vestibule and outer platform. When the outer platform is high, a trap door is normally locked in place over the steps.

A lift platform 18, which takes the place of a conventional trap door, is adapted to receive a wheel chair 20 which may carry an elderly or handicapped person 22 unable to walk up or down the steps 12. When a person normally enters the car 10, the platform 18 is lowered to rest on the lower station platform 14, as illustrated in FIG. 1. After the wheel chair 20 has been wheeled on to the lift platform 18, the lift platform may be lifted up and over the steps 12 to the position illustrated in FIG. 2 where it is level with the floor 16, which may form part of the vestibule at the end of the car. The lift platform 18 is maintained in a horizontal plane as it is lifted from the position illustrated in FIG. 1 to that illustrated in FIG. 2.

When the handicapped person is leaving the car, a reverse operation takes place. The wheel chair 20 is moved on to the lift platform 18 when it is in the up position level with the floor 16, (FIG. 2). The lift platform 18 is then lowered to the lower station platform 14 (FIG. 1) where the wheel chair 20 may then be wheeled off the lift platform on to the lower station platform 14.

The lift platform 18 is mounted to the structure of the car 10 through a four-bar linkage. This linkage comprises arms or links 24, 26, 28 and 30 (FIG. 3). The arms are arranged so that when they swing out of the car 10, the lift platform 18 is lowered from the position illustrated in FIG. 2 to the position illustrated in FIG. 1. When the arms 24, 26, 28 and 30 are retracted into the car body, the lift platform 18 is raised to the level of the floor as illustrated in FIG. 2.

The arms 24 and 28 are pivotally secured to the structure associated with one of the lower steps at pivot connections such as the pin pivot connection 36, with only the connection of arm 24 being illustrated in FIGS. 1 and 2, it being understood that the arm 28 may be connected by similar means. The other ends of the arms 24 and 28 are connected to pivot elements secured to the bottom of the lift platform 18 at pivot connections, such as pivot connection 38, with only the connection of arm 24 being illustrated in FIGS. 1 and 2. The connection 38 may be one end of a rod extending from one side to the other below the platform, with the arm 28 being pivotally connected to the opposite end of the rod. Brackets or any other suitable connecting structures may be employed in place of rods.

The arms 26 and 30 are connected inwardly towards the center of the platform 18 a greater distance than the outer arms 24 and 28. The two pairs are disposed to move in different vertical planes. This is necessary to permit the arms to move free of each other when they are raised or lowered.

As illustrated in FIG. 3, one end of each of the arms 26 and 30 is connected by welding or other suitable means to a drive rod 40. Each one of the other ends of the arms 26 and 30 is connected to pivot elements connected to the bottom of the lift platform 18. The pivot connections may be ends of a rod extending from one side to the other across the bottom of the lift platform 18. Only one such pivot connection 42 for arm 26 is illustrated in FIGS. 1 and 2.

Power means for lifting the platform 18 includes a motor 32 connected to a drive chain 34. The chain 34 drives a sprocket wheel 44 which includes a connecting member 46. The member 46 is secured to the rod 40 by welding or other means.

Various gear boxes and other connecting members, which may be used in the drive system, are well known and omitted for purposes of clarity and because they are not directly related to the present invention. It is also apparent that the sizes of the structural members illustrated will depend upon the structural strength required to lift the mass of the wheel chair and the handicapped person in the chair.

The motor 32 is reversible to move the platform up and down and may be driven by an electrical source within the car. Various electrical circuits for controlling the time and duration of the operation of the motor 32 during the up and down cycles of the lift platform are not illustrated since such control circuits are known and not directly related to the invention. For example, limit switches may be employed to detect the downmost and uppermost positions of the lift platform to automatically stop the motor 32 after it has been manually started.

The driving means including the motor 32 is disposed back into the car so that it does not interfere with the side clearance line of the car. The positioning of the driving means is such that an emergency crank may be readily connected to the end of the car to manually control the movement of the lift platform. This provides a fail safe feature which permits the lift platform 18 to be cranked up or down in the event of power failure or trouble with any of the electrical components. All the links 24, 26, 28 and 30, as well as their pivot points, are within the side clearance of the car 10.

A feature of the present invention is that the lift platform 18 occupies the same area as that occupied by the trap door in many conventional railway cars. This means that retrofitting existing cars with lift platforms of the type involving the present invention may be accomplished without an overall redesign of the car.

The lift platform 18 is designed with elements to prevent the wheel chair 20 from rolling after it is on the platform. The main portion of the platform 18 includes a main support plate 48 having a downwardly and rearwardly extending end section 50. An end strip 52 is attached to the section 50 and is curved upwardly to permit a wheel chair to be rolled over a folded over strip 54 secured to the main plate 48 on to the main surface. The strips 52 and 54 have a groove 55 therebetween within which the door of the car passes when the door is in the process of closing.

The strip 54 is flat at its top area and includes a section extending angularly downwardly towards the main support plate 48. The strip 54 provides a raised section with respect to the wheels of the wheel chair 20. A somewhat similar raised strip 56 is secured to the opposite end of the support plate 48. The strips 54 and 56 in effect form a recess in the lift platform 18 so as to provide stability to the wheel chair when it is on the platform and limit the accidental rolling of the wheel chair off of the lift platform.

The main support plate 48 may be reinforced with bars or strips 58 which are secured to the bottom of the plate to add strength to the lift platform 18.

Referring particularly to FIG. 4, the lift platform 18 and various elements connected therewith are the same as those described in connection with FIGS. 1, 2 and 3.

A support member 60 comprises an inverted "U" member having a top rail 61 supported by a pair of legs 62 and 64, which are secured by any suitable means on the main support member 48 towards the side of the lift platform 18. The support member 60 includes a seat member 66, which is adapted to be up in a vertical stored position (as illustrated in dotted lines), or down in a horizontal position when it is in use (as illustrated by the solid lines.

When the seat 66 is up in a stored position, it does not provide any obstacle for the non-handicapped passengers in getting on or off the car. Some handicapped persons, for example ones on crutches, may not require a wheel chair or seat but are still unable to go up or down steps. In these cases, a handicapped person may merely stand on the lift platform 18 and be raised or lowered. He may wish to grip the support member 60 for manual support.

In the case of handicapped persons not in wheel chairs but requiring physical support, the seat 66 is lowered to a horizontal position. The handicapped person may then sit on the lowered seat and be lifted or lowered over the steps by the lift platform 18 in the same manner as if a wheel chair containing a handicapped person were being lifted.

The seat 66 includes a collar member 68 surrounding and adapted to move around a center shaft 70 connected to the legs 62 and 64. A manually operated catch member 72, which may have two spaced fingers such as finger 71, is provided to receive and hold the seat 66 in an upright or stored position.

When the seat 66 is to be put down, the latch or catch 72 is lifted to permit the seat 66 to be lowered. Stop elements 74 are disposed on the ends of the shaft 70 and engage cutaway sectons 75 on "T" elements 76 and 78 so that the seat is held level in a down position when the catch 72 is released.

Numerous different ways, other than those illustrated, may be employed to maintain the seat in horizontal or vertical positions.

In some cases, it may be desirable to provide a support member 60 on both sides of the lift platform 18. This would enable handicapped persons to manually grip both rails for additional support.

What is claimed is:

1. In combination with a railway car having steps leading from a lower level outside of the railway car to a higher level inside the railway car, (a) a movable platform connected to said car having stationary means for securing and positioning a wheeled vehicle thereon against rolling movement in both directions;

(b) means for moving said platform over said steps between said lower and higher levels, and (c) means for maintaining said platform in a horizontal position as it is moved from said lower level to said higher level.

2. A combination as set forth in claim 1 wherein a bar linkage is connected between said platform and said car and driving means are provided to drive said bar linkage to move said platform between said lower and higher levels.

3. A combination as set forth in claim 2 wherein said higher level is on the same level as a floor of said railway car and said platform is over said steps at the same level as said floor when it is at said higher level.

4. A combination as set forth in claim 3 wherein said securing means comprise first and second strips connected to said platform to provide obstacles to prevent a wheel chair from rolling off said platform.

5. A combination as set forth in claim 4 wherein a third strip is provided in close proximity to said first strip with a groove therebetween to permit a door of said car to pass therein during an opening and closing operation.

6. A combination as set forth in claim 5 wherein a support member is connected on the side of said platform.

7. A combination as set forth in claim 6 wherein a seat member is connected to said support member, with means being provided to maintain said seat member in a vertical horizontal position.

8. A combination as set forth in claim 7 wherein said bar linkage comprises two pairs of bars disposed to move in different parallel vertical planes when said platform is being moved.

9. A combination as set forth in claim 8 wherein said driving means comprises an electric motor and a chain drive connected to said bar linkage.

* * * * *